United States Patent [19]

Kishimoto

[11] Patent Number: 4,497,600
[45] Date of Patent: Feb. 5, 1985

[54] END MILL

[75] Inventor: Kiyoshi Kishimoto, Osaka, Japan

[73] Assignee: Kabushikigaisha Nippon Kogu Seisakusho, Osaka, Japan

[21] Appl. No.: 482,973

[22] Filed: Apr. 7, 1983

[30] Foreign Application Priority Data

Sep. 8, 1982 [JP] Japan .................. 57-156148

[51] Int. Cl.³ .............................. B26D 1/12
[52] U.S. Cl. ..................... 407/53; 407/59; 407/61
[58] Field of Search ...... 407/53, 54, 58, 59, 407/61, 63

[56] References Cited

U.S. PATENT DOCUMENTS 3,548,476 12/1970 Cave et al. ............... 407/54
4,083,643 4/1978 Parone ................... 407/59

FOREIGN PATENT DOCUMENTS 50-31312 10/1975 Japan .
53-6394 3/1978 Japan .
53-9024 3/1978 Japan .
53-21157 6/1978 Japan .
53-23556 7/1978 Japan .
53-38951 9/1978 Japan .
53-44150 10/1978 Japan .
55-11444 3/1980 Japan .
57-39129 8/1982 Japan .
57-57868 12/1982 Japan .
48-24461 7/1983 Japan .

Primary Examiner—Francis S. Husar
Assistant Examiner—William E. Terrell
Attorney, Agent, or Firm—Wenderoth, Lind & Ponack

[57] ABSTRACT

An end mill has a plural number of helical blades formed on the main body of a machine tool. Each of the blades is provided with a plural number of notches spaced along its length and shifted relative to the corresponding notches in the preceding blade. When the notch is shifted to the tool end of the tool, the notch is inclined toward the shank end. On the other hand, when the notches are shifted toward the shank end of the tool, the notches are inclined in the opposite direction, i.e. toward the tool end. Therefore, the wear by rubbing on the side of the blade is diminished, the cutting resistance is decreased and the cutting performance is increased.

3 Claims, 10 Drawing Figures

END MILL

BACKGROUND OF THE INVENTION

The present invention relates to a roughing and finishing end mill.

There is known a roughing end mill which makes highly efficient rough working possible by cutting chips into small pieces by blades provided with notches.

Recently, with the widespread use of a machining center, NC (numerically controlled) machine tool or the variety of requirements of users, the demand for a roughing and finishing end mill which is highly efficient and which does not require that finishing work be performed on the milled workpiece is increasing.

These have been well known for use as roughing end mills the so-called backing-off end mills the flanks of the circumferential edges of the blades of which are off-center in a cross-sectional view through the axis of the end mill as shown in FIG. 1(a) and the conventional type end mill with flat circumferential edge blades shown in FIG. 1(b). In these figures, the broken line indicates the shape of the bottom surface of a notch formed in the circumferential surface or the backing off for cutting chips into pieces.

The present invention relates to the shape and the arrangement of notches provided in each blade to form cutting parts which are defined between the notches in the blades of the roughing end mill of the type shown in FIG. 1(b).

In the conventional end mill, the notches are formed in either of two ways. One is to provide notches 3 on the plural helical blades 2 perpendicularly to the axis of rotation as shown in FIG. 2(b), and the other way is to cause the notches to extend helically to extend helically (left-hand helix in most cases) to the axis of rotation as shown in FIG. 2(b).

In the arrangement shown in FIG. 2(a), the blades and notches are arranged so that there will be no portions of the workpiece left without being worked on by the mill, that is, so that during one revolution of the tool it performs cutting work on the workpiece without leaving any portion unworked. Therefore, a notch in a neighbouring blade is shifted toward the end of the blade or toward the shank of the tool relative to any given notch. However, in the case of cutting with a tool, in which the notches are perpendicular to the blade body, the side-clearance angle of the main body is zero. In this case, a heavy wear of the corner is caused, and a special machine tool for exclusive use on such cutting is necessary and the working time may become longer.

In the latter (the case shown in FIG. 2(b)), the cutting in a single screw thread causes the blade to be offset as much as amount of the lead of the screw, making always the negative side of the side clearance the main blade, so that cutting is unfavorably done by the side not suitable for cutting. Therefore it has been suggested that the angle of the blades be changed by employment of multiple screw threads for cutting by the positive side of the side clearance angle, and the arrangement of notches in neighbouring helical blades be shifted in the reverse direction (Public Notice of patent application in Japan, 1975, No. 50-31312).

However, according to the working as described above, the number of blades for receiving notches determines the shape of the blades and the side clearance angle. Also, this arrangement may have following faults: be selected. The notch does not play a role in the function of the blade when it is shallow after it is reworked because the bottom of notch is on a circumference. The frequency of reworking of the blade is decreased.

SUMMARY OF THE INVENTION

An object of the present invention is to provide an end mill wherein the shape and the arrangement of notch required for the blade can be freely selected without using thread cutting.

The other object is to provide an end mill for rough cutting with an excellent cutting performance.

In the end mill provided with notches, notches are arranged at a prescribed interval along the whole length of each blade. These notches are shifted a regular amount relative to the notches in a preceding blade and a subsequent blade. When notches are shifted tword the end, the clearance angle is upward to the right, and when notches are shifted toward the shank, the side clearance is downward to the left.

DETAILED DESCRIPTION OF THE INVENTION

The present invention will be described in detail according to some embodiments.

Figure 1A:
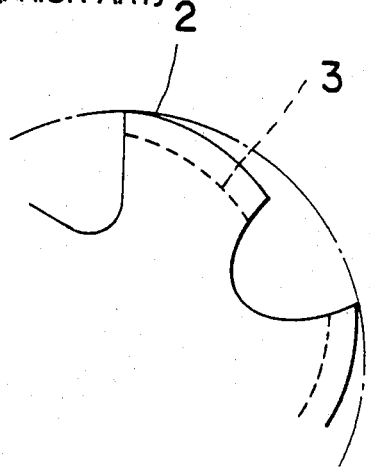
FIG. 1(a) and 1(b) are partial sectional views showing a cross section of a blade for a roughing and finishing end mill.
Figure 1B:
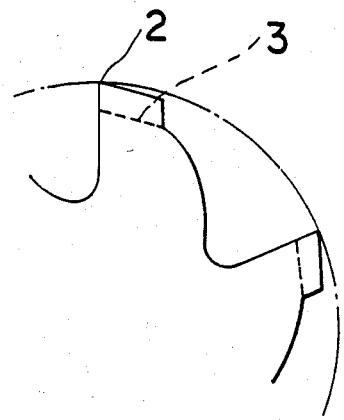
Figure 2A:
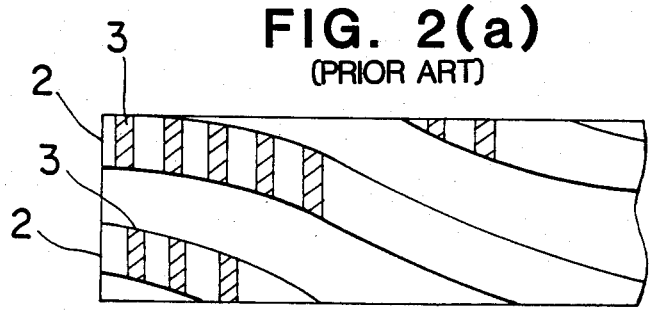
FIG. 2(a) and 2(b) are frontal views showing positions of notches in a roughing and finishing end mill.
Figure 2B:
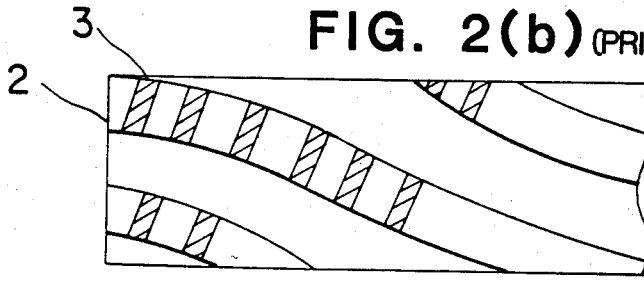
Figure 3:
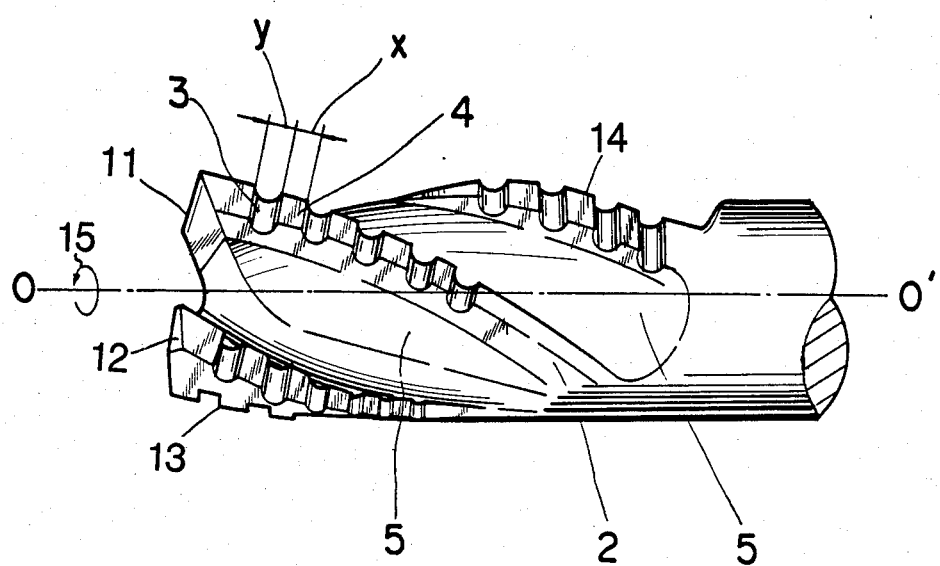
FIG. 3 is a frontal view of an embodiment of a roughing end mill according to the present invention.

FIG. 3 shows the first embodiment of the present invention applied to an end mill having the shape of a general end mill with four helical blades the cross section of which perpendicular to the axis is as shown in FIG. 1(b).

In FIG. 3 the reference numeral 1 indicates the main body of a cutting tool having the axis 0—0', the end 0 being the tool end and 0' being the shank end. A plurality (four) of helical blades 2, respectively designated 11, 12, 13 and 14, are defined by helical grooves or flutes 5 between blades.

Along the whole circumferential surface of each blade, notches 3 extending transverse to the length of the blade are machined at prescribed intervals. Each notch is shifted slightly along the blade toward the end or the shank relative to a corresponding notch on the preceding blade, relative to the direction of rotation as indicated by the arrow 15 in FIG. 3.

Figure 4:
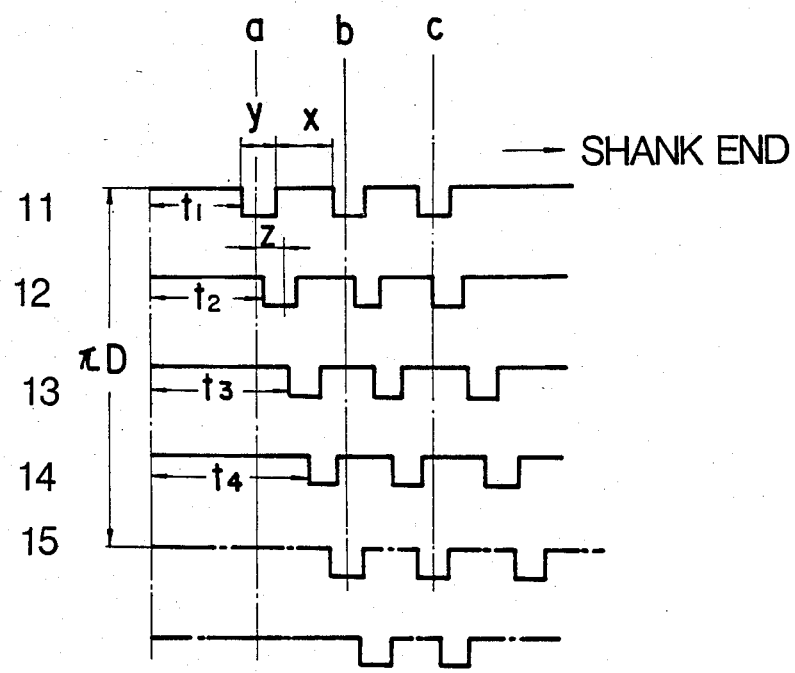
FIG. 4 is a view showing the arrangement of notches.
Figure 5:
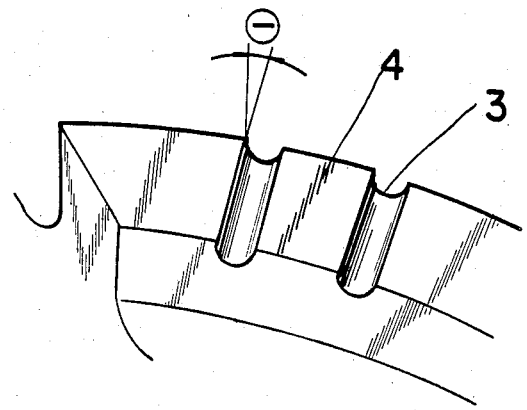
FIG. 5 is an enlarged perspective view showing an example of the side clearance of the first embodiment.

FIG. 4 is a developed view showing the arrangement of notches in the four blades 11–15.

When X is taken as the width of the blade surface 4 between notches, Y as the width of the notch, and Z as the amount of shift of a notch relative to the corresponding notch in the adjacent preceding blade, the shift of notch Z is at least equal to $(X+Y)/(N)$ (where N is the number of blades). In FIG. 4 the notches are shifted toward the shank end, and $\pi D$ is the length of the circumference of the tool with a diameter of D. In the case of four blades, the shift Z for each notch has to satisfy the condition described above for the group of notches at the tool end, that is, in the interval between a~b. However, at the shank end, between b~c, the value Z need not necessarily to made equal to the value between a~b if values X and Y are changed. The notches in each blade are inclined toward the shank end (positive side) or toward the tool end (the negative side) perpedicular to the axis.

Figure 6:
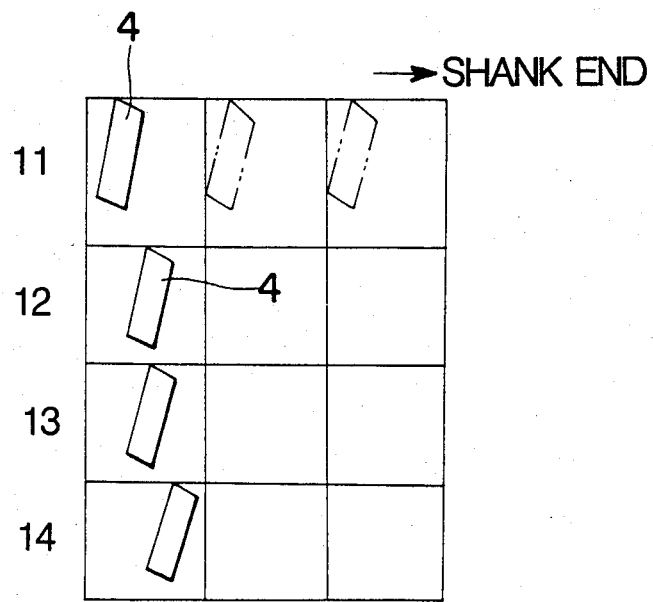
FIG. 6 is a developed view of an end mill provided with notches as shown in FIG. 5.
Figure 7:
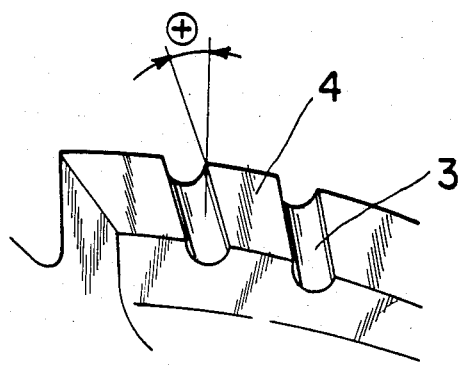
FIG. 7 is an enlarged perspective view of an example of the side clearance angle of a notch of a second embodiment.
Figure 8:
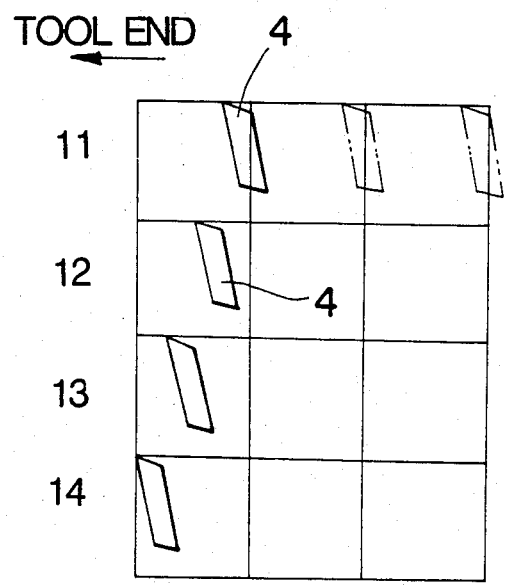
FIG. 8 is a developed view of an end mill with notches formed as shown in FIG. 7.

When the notches are shifted toward the shank end, the shank side plays the role of the main blade so that the notch is inclined toward the tool end in the direction from the leading side to the trialing side of the blade (the negative side). FIG. 6 is a developed view of the case in which notches are shifted toward the shank end. FIG. 7 shows a second embodiment wherein the tool end side plays the role of the main blade and the notch is inclined toward the shank end in the direction from the leading edge to the trailing edge of the blade (the positive side). FIG. 8 is a developed view showing notches shifted toward the tool end.

The clearance angle of the notch can be selected to be the same clearance most suitable as a notch for an ordinary tool.

If the notches are formed starting from the end of the blade adjacent the tool end, the blade tip may have a thin portion and be weak and have a tendency to be damaged. Therefore, as shown in FIG. 4, the first notch is spaced a distance $t_1$ from the tool end of the blade 11, the first notch a distance $t_2$ in the blade 12, and $t_3$ in the blade 13, and so forth.

The applicant of the present invention has obtained the following concrete values for form and dimensions for the case wherein the present invention is applied to an end mill with four blades.

| Tool: | Dia. (∅) | 20 | (unit in mm) |
|---|---|---|---|
| | Blade Length | 45 | |
| | O.L. | 125 | (overall length) |
| | Dia. of Shank | 20 | |

$X = 1.96$ $Y = 1.6$ $Z = 0.87$ (Nick is shifted to the tool end.)
Work: AISI 1045
Depth of Cut: 30 mm in the direction of the axis 5 mm in the lateral direction
Result: The end mill according to the present invention can increase the feeding speed as much as 3.6 times as compared with the conventional type end mill.

The present invention can be applied to a cutting tool of the backing-off type in the same way.

In the embodiment shown above, although the description is given for the case of four blades, the present invention can be applied to different numbers of blades.

As described above in regard to the embodiments, in the end mill according to the present invention, the notches are arranged at the prescribed intervals along the whole length of the blade, being shifted a predetermined amount in the direction of the axis relative to the preceding blade and the succeeding blade. In the case of shifting toward the tool end, the inclination is toward the shank end and when shifting is toward the shank end, the inclination is toward the tool end. These matters bring about the following effects:

(1) Since the notches are formed at the prescribed intervals and with a shift of the prescribed amount, rather than being screw threads, the side clearance of the notch is not limited by the number of blades. The value of the side clearance, and the interval and the form of the notch can be freely selected.

(2) Since the direction of the side clearance is varied by the direction of the shift of the notches relative to the proceding and the succeeding blades, the cutting by the main blade is perfectly performed with an important effect of elevating the cutting performance.

(3) The angle of notch and the shape of the notch can be freely selected depending on the material to be cut. In the conventional tool in which the notch is formed as a thread, these values are fixed.

(4) There are faults as follows in the prior art in which the notch is formed as a thread:

Since the notch is formed on a circumference, it does not play the role of a blade at its bottom surface. By repeated recutting, the groove on the foregoing portion from the heel disappears.

On the contrary, according to the present invention, the notches are formed on the whole surface of each blade, and therefore same is cut at the same depth along the circumferential cutting edge.

(5) The material can be worked perfectly without leaving any part unworked, because the amount of shift of the notches is freely determined according to the width and the shape of the notch.

The cutting edge can be protected from damage by specifying the distance where the first notch from the tool tip is formed.

I claim:

1. An end mill comprising:
   a main body having a tool end and a shank end and rotatable in one direction for performing a milling operation;
   at least three of helical blades extending along said main body from said tool end toward said shank end and having helical flutes therebetween defining said blades, the outer peripheral surfaces of said blades each having a plurality of transverse notches spaced therealong in the direction of the length of said main body and at predetermined intervals with the notches in each blade shifted a distance $Z$ in one longitudinal direction of the main body from the corresponding notches in the blade which precedes said blade in the rotation of said main body during a milling operation, said distance $Z$ being according to formula: $Z = (X + Y/N)$ where N is the number of blades, X is the distance along the blade surface between the notches and Y is the dimensions of the notches along the blade surface, said notches being inclined in the direction from the leading side of the blade during rotation to the trailing side of the blade in a direction opposite to the direction in which the notches are longitudinally shifted relative to the notches in a preceding blade.

2. An end mill as claimed in claim 1 in which said notches are shifted in the direction toward said shank end, and said notches are inclined toward said tool end.

3. An end mill as claimed in claim 1 in which said notches are shifted in the direction toward said tool end, and said notches are inclined toward said shank end.

* * * * *